(12) United States Patent
Takenouchi et al.

(10) Patent No.: US 9,010,878 B2
(45) Date of Patent: Apr. 21, 2015

(54) BRAKE APPARATUS FOR MOTORCYCLE

(75) Inventors: Kazuya Takenouchi, Wako (JP);
Yoshiaki Sawano, Wako (JP); Shuichi Fukaya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 428 days.

(21) Appl. No.: 13/368,803

(22) Filed: Feb. 8, 2012

(65) Prior Publication Data

US 2012/0205968 A1 Aug. 16, 2012

(30) Foreign Application Priority Data

Feb. 14, 2011 (JP) ................................ 2011-028688

(51) Int. Cl.
*B60T 13/00* (2006.01)
*B60T 8/26* (2006.01)
*B60T 8/40* (2006.01)
*B60T 13/70* (2006.01)
*B60T 8/17* (2006.01)

(52) U.S. Cl.
CPC .............. *B60T 8/261* (2013.01); *B60T 2230/00* (2013.01); *B60T 8/1706* (2013.01); *B60T 8/17* (2013.01); *B60T 8/4081* (2013.01)

(58) Field of Classification Search
CPC ........... B60T 7/12; B60T 8/17; B60T 8/1706; B60T 8/171; B60T 8/1766; B60T 8/26; B60T 8/261; B60T 13/66; B60T 2201/14; B60T 2230/00; B60T 2250/00; B60K 17/348
USPC ............ 303/9.62, 9.64, 15, 137, 186; 701/70, 701/78; 188/349
See application file for complete search history.

(56) References Cited

U.S. PATENT DOCUMENTS

| | | | | |
|---|---|---|---|---|
| 5,620,237 A * | 4/1997 | Iwashita et al. | .............. | 303/9.64 |
| 7,841,671 B2 * | 11/2010 | Nakayama et al. | .......... | 303/9.64 |
| 2010/0066160 A1 * | 3/2010 | Atsushi et al. | ............... | 303/9.64 |
| 2011/0024249 A1 * | 2/2011 | Nishikawa et al. | ........... | 188/349 |
| 2011/0031054 A1 * | 2/2011 | Matayoshi | ..................... | 180/227 |
| 2011/0043031 A1 * | 2/2011 | Nishikawa et al. | ............ | 303/137 |
| 2011/0273005 A1 * | 11/2011 | Westerfeld | ................... | 303/9.64 |

FOREIGN PATENT DOCUMENTS

JP 2006-175993 7/2006
WO WO-2010046991 A1 * 4/2010

* cited by examiner

*Primary Examiner* — Melody Burch
(74) *Attorney, Agent, or Firm* — Rankin, Hill & Clark LLP (57) ABSTRACT

A brake apparatus that can achieve front-rear distribution in accordance with a traveling environment variation. At an intermediate point from a start point of a second mode, first interval to an end point of a second mode, second interval, the increasing rate of braking force for a front wheel with respect to an operation amount is changed. The increasing rate of the operation amount prior to the intermediate point can be represented by a first inclination of a curve while the increasing rate of the operation amount after the intermediate point is represented by a second inclination of the curve. The first inclination is less than the second inclination. Setting the increasing rate after an intermediate point to be higher than the increasing rate before the intermediate point, the vehicle body generation deceleration can be caused to increase in a linear proportion to the operation amount.

7 Claims, 8 Drawing Sheets

BRAKE APPARATUS FOR MOTORCYCLE

BACKGROUND OF THE INVENTION

1. Field of the Invention

This invention generally relates to a brake apparatus for a motorcycle and, more particularly, toward a combined brake system in which the front brake apparatus and rear brake apparatus are interlocked.

2. Description of Related Art

A brake apparatus of the by-wire type (BBW: brake by wire) is practically used. This brake apparatus (BBW) detects a brake operation amount and generates fluid pressure with a fluid pressure modulator based on the detected value so that braking force is generated from the fluid pressure. With the brake by wire apparatus (BBW) described above, an ABS (Antilock Brake System) function can be exhibited.

Further, a system is known wherein front and rear brake apparatus are interlocked with each other by operation of one of the front and rear brake operating elements in addition to the ABS function. In this regard, refer to, for example, Japanese Patent Laid-Open No. 2006-175993 (FIGS. 1 and 3).

A system wherein front and rear brake apparatus are interlocked with each other is called CBS (Combined Brake System), and the CBS function is selected by changing a mode changeover switch 32, shown in FIG. 1 of Japanese Patent Laid-Open No. 2006-175993, and then front wheel braking force and rear wheel braking force are controlled based on a fixed correlation, as illustrated in FIG. 3 of Japanese Patent Laid-Open No. 2006-175993.

In this manner, in the conventional CBS function, the front-rear distribution of braking force is determined uniquely. However, from a point of view of a rider, since a front-rear distribution upon forward traveling, for example, in such a case that the μ of the road surface is so high that high braking force of a tire can be expected, a distribution in the case where importance is attached to vehicle body control upon turning, and a front-rear distribution in the case where the road surface μ is low are different from one another in response to a variation of the traveling environment, such as traveling on a public road and traveling circuit, and a variation of road surface condition, such as a dry road surface and a wet road surface, there is room for further improvement in order to be ready for a variation of the front-rear distribution of braking force in response to various environments because there is a demand to change the front-rear distribution in response to changes in the traveling environment.

In the case where braking force is generated also by the rear wheel in an interlocking relationship with a braking operation for the front wheel, although basically the vehicle should be decelerated at a deceleration conforming to an ideal vehicle body deceleration, since, in the vehicle body, the load principally on the front wheel side is inclined to become higher than that on the rear wheel side by braking and, on the rear wheel side, the rear wheel side load decreases by sink of the suspension for the front wheel side, in the case where front-rear interlocking braking is to be carried out, the braking force to the rear wheel side is sometimes changed over from increase to decrease rather early. In this instance, if the braking force to the rear wheel side changes over from increase to decrease although the braking force to the front wheel side increases, then this results in variation of the increasing degree (inclination or rate of change) of the deceleration as a vehicle body, and the linearity of the deceleration tends to fade. Thus, there is a case in which adjustment of the vehicle body deceleration by a braking operation for the front wheel becomes difficult.

SUMMARY OF THE INVENTION

The present invention is directed toward removing or solving these problems in the art, and provides a brake apparatus that can carry out front-rear distribution in accordance with a traveling environment variation.

In accordance with one aspect of the present invention, a brake controlling apparatus for a motorcycle of the by-wire type wherein an operation amount applied to each of brake operation device for front and rear wheels is detected by an electronic control unit. Fluid pressures are generated by fluid pressure modulators for the front and rear wheels based on the detection values and braking force is generated for brake apparatus for the front and rear wheels by the fluid pressures. The control unit causes the brake apparatus for the front and rear wheels to operate such that, when the brake operation device for the front wheel is operated, the brake apparatus for the front wheel generates braking force for the front wheel in response to an operation amount of the brake operation device for the front wheel and causing the brake apparatus for the rear wheel, which is not operated, to generate braking force for the rear wheel which interlocks with the operation amount of the brake operation device for the front wheel. This causes, within a first interval in which the operation amount of the brake operation device of the front wheel changes from zero to a first predetermined value, the braking force for the front wheel to increase gradually and causing the braking force for the rear wheel to gradually increase irrespective of a brake operation of the rear wheel. Further, within a second interval in which the operation amount of the brake operation device of the front wheel changes from the first predetermined value to a second predetermined value higher than the first predetermined value, the braking force for the front wheel gradually increases while the braking force for the rear wheel is kept to a maximum value in the first interval. Also, increasing or decreasing, within a period from a start point of the first interval to an end point of the second interval, the increasing rate of the braking force for the front wheel with respect to the operation amount to increase or decrease the deceleration of the vehicle so as to vary substantially linearly with respect to an increase of the braking force of the brake for the front wheel.

Thus, according to the present invention, control over increasing or decreasing, within the period from the start point of the first interval to the end point of the second interval, the increasing rate of the braking force for the front wheel with respect to the operation amount to increase or decrease the deceleration of the vehicle so as to vary substantially linearly with respect to the increase of the braking force of the brake for the front wheel is carried out. If the increasing rate of the braking force of the front wheel with respect to the operation amount is varied, then the vehicle body generation deceleration with respect to the operation amount can be varied. In particular, it becomes possible to arbitrarily select to cause the vehicle body generation deceleration to increase in linear proportion to the operation amount, to cause the vehicle body generation deceleration with respect to the operation amount to increase exceeding linear proportion (for example, in a secondary function), or to cause the vehicle body generation deceleration with respect to the operation amount to decrease below linear proportion (for example, in a square root function). In accordance with another aspect of the invention, during a third interval within which the operation amount of the brake operation device for the front wheel exceeds the second predetermined value, the braking force for the front wheel is gradually increased and the braking force for the rear wheel is gradually decreased in response to the increase of the operation amount. Within the third interval, the braking force for the front wheel is gradually increased and the braking force for the rear wheel is gradually decreased in response to the increase of the operation amount. Since importance is attached to the front wheel braking, braking control suitable for the motorcycle is carried out.

In accordance with a further aspect of the invention, the increasing rate of the braking force for the front wheel with respect to the operation amount is set such that the increasing rate after an intermediate point from the start point of the first interval to the end point of the second interval is higher than the increasing rate from the first interval to the intermediate point. By setting the increasing rate after the intermediate point higher than the increasing rate before the intermediate point, the vehicle body generation deceleration can be caused to increase in linear proportion to the operation amount.

If the vehicle body generation deceleration is caused to increase in linear proportion to the operation amount, then at an initial stage of braking (when the operation amount is small), the variation amount of the braking force of the front and rear wheels can be made small giving priority to posture control, but in the latter half of the braking (when the operation amount is great), priority is given to the braking action.

In accordance with another aspect of the invention, the brake controlling apparatus includes a mode changeover device for allowing changeover of a plurality of control modes of the braking force by an operation by a driver. Further, a plurality of modes are provided in the control modes wherein, in the first control mode, when the brake operation device for the front wheel is operated, braking force is generated by the brake apparatus for the front wheel in response to an operation amount of the brake operation device for the front wheel while braking force interlocking with the operation amount of the brake operation device for the front wheel is generated for the rear wheel by the brake apparatus for the rear wheel which is not operated. During a first mode, first interval, within which the operation amount of the brake operation device for the front wheel varies from zero to a first mode, first predetermined value, the braking force generated on the rear wheel gradually increases corresponding to the increase of the operation amount.

During a first mode, second interval within which the operation amount of the brake operation device for the front wheel varies from the first mode, first predetermined value to a first mode, second predetermined value higher than the first mode, first predetermined value, the braking force generated on the rear wheel is kept at a maximum value in the first mode, first interval irrespective of increase of the operation amount. Further, during a first mode, third interval within which the operation amount of the brake operation device for the front wheel exceeds the first mode, second predetermined value, the braking force generated on the rear wheel gradually decreases in a corresponding relationship to increase of the operation amount. In further accordance with the present invention, during a second control mode, when the brake operation device for the front wheel is operated, braking force is generated by the brake apparatus for the front wheel in response to the operation amount of the brake operation device for the front wheel while braking force, interlocking with the operation amount of the brake operation device for the front wheel, is generated for the rear wheel by the brake apparatus for the rear wheel, which is not operated. During a second mode, first interval within which the operation amount of the brake operation device for the front wheel varies from zero to a second mode, first predetermined value, the braking force generated on the rear wheel gradually increases corresponding to the increase of the operation amount, but is set lower than the braking force generated on the rear wheel within the first mode, first interval. During a second mode, second interval within which the operation amount of the brake operation device for the front wheel varies from the second mode, first predetermined value to a second mode, second predetermined value higher than the second mode, first predetermined value, the braking force generated on the rear wheel is kept at a maximum value in the second mode, first interval irrespective of increase of the operation amount and further is lower than braking force generated on the rear wheel within the first mode, second interval.

Further, during a second mode, third interval within which the operation amount of the brake operation device for the front wheel exceeds the second mode, second predetermined value, the braking force generated on the rear wheel gradually decreases in a corresponding relationship to increase of the operation amount and besides the operation amount at a point at which the braking force exhibits a minimum value is set higher than the operation amount in the first control mode. The second control mode is a mode in which the increasing rate of the braking force for the front wheel with respect to the operation amount is changed intermediately of a period from a start point of the second mode, first interval to an end point of the second mode, second interval. The electronic control unit controls the brake apparatus for the front and rear wheels to generate braking force in response to the selected control mode. The first control mode and the second control mode can be changed over arbitrarily therebetween, and a braking force front-rear distribution ready for a variation of the traveling environment is provided.

In addition, in the second mode, since the increasing rate of the braking force for the front wheel with respect to the operation amount is changed intermediately of the period from the start point of the second mode first interval to the end point of the second mode second interval, it is possible to cause the vehicle body generation deceleration to increase in linear proportion to the operation amount.

If the vehicle body generation deceleration is caused to increase in linear proportion to the operation amount, then at an initial stage of braking (when the operation amount is small), the variation amount of the braking force of the front and rear wheels can be made small giving priority to posture control, but in the latter half of the braking (when the operation amount is great), priority is given to the braking action.

Then, in the first interval (initial interval of the braking), in the second control mode, the braking force for the rear wheel generated by the brake operation device for the front wheel is suppressed in comparison with that in the first control mode. The second control mode can be used as a mode which is useful, for example, in the case of a will to carry out attachment of importance to posture control of the turnability rather than a will to brake during cornering.

In the second interval, in contrast to the first control mode, in the second control mode, the posture can be controlled by the braking force of the front wheel rather than that by unnecessarily increasing the braking force of the rear wheel.

In the third interval, for example, when it is desired to carry out deceleration in a period of time as short as possible, braking force of the front wheel and braking force of the rear wheel are generated.

In contrast to the first control mode, in the second mode, it is easy to maintain braking force of both wheels. In the second control mode, the rider need not operate both the brake operation device for the front wheel and the brake operation device for the rear wheel, but may only carry out operation of the brake operation device for the front wheel. In other words, an ideal front-rear braking distribution can be carried out automatically in the second control mode rather than in the first control mode, and it can be said that the rider can concentrate its attention upon the brake operation for the front wheel.

In further accordance with the present invention, the brake controlling apparatus for the motorcycle includes a mode changeover device having a switch provided on a handle bar. The mode changeover device is provided on the handle bar and can be operated for the changeover while the grip is kept grasped, resulting in improvement in convenience in use.

In the first control mode and the second control mode, when the brake operation device for the rear wheel is operated, braking force is generated by the brake apparatus for the rear wheel in response to an operation amount of the brake operation device for the rear wheel while braking force interlocked with the operation amount of the brake operation device for the rear wheel is generated by the brake apparatus for the front wheel, which is not operated. The braking force for the rear wheel is set higher than the braking force for the front wheel.

The operation amount of the brake operation device for the rear wheel by which braking of the front wheel is started is set such that the operation amount in the second control mode is greater than the operation amount in the first control mode. The braking force for the rear wheel is set higher than the braking force for the front wheel, and the operation amount of the brake operation device for the rear wheel before braking of the front wheel is started is set such that the operation amount in the second control mode is greater than the operation amount in the first control mode.

If the brake operation device for the front wheel is a brake lever and the brake operation device for the rear wheel is a brake pedal, then it is said that the brake pedal operated by a foot is more difficult in operation than the brake lever operated by a hand. According to the present invention, deceleration by a foot operation which is more difficult to control than a hand operation can be carried out with certainty.

BRIEF DESCRIPTION OF THE DRAWINGS

These and further features of the invention will be apparent with reference to the following drawings, in which.

DETAILED DESCRIPTION OF THE PREFERRED EMBODIMENT

An embodiment of the present invention is described below with reference to the accompanying drawings.

Figure 1:
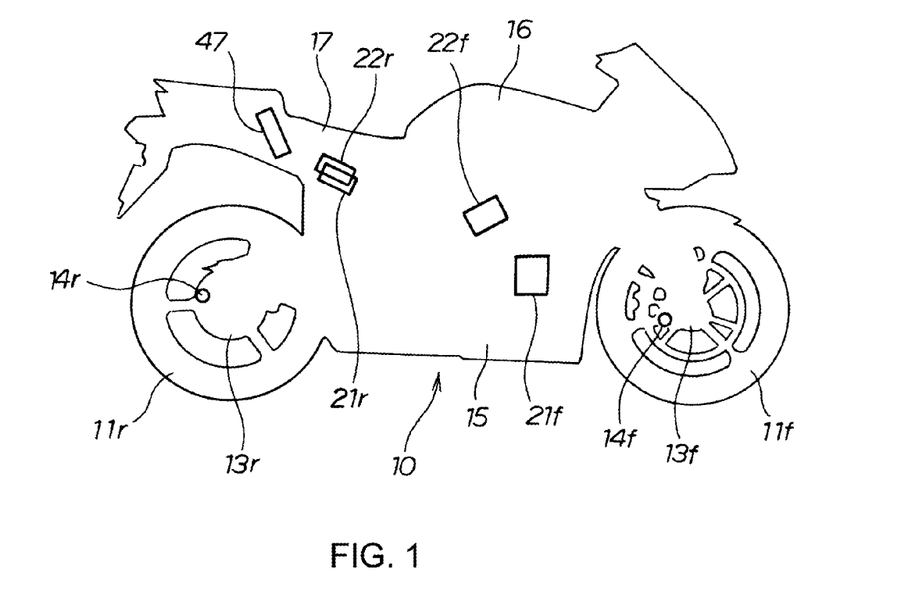
FIG. 1 is a right side elevational view (conceptual view) of a motorcycle according to the present invention.

As shown in FIG. 1, in a motorcycle 10, to a front wheel 11$f$ (f is a subscript representative of the front. This similarly applies also in the following description), a pulser ring 13$f$ is attached, and a front wheel speed sensor 14$f$ that counts the number of pulses of the pulser ring 13$f$ to detect the speed of rotation of the front wheel 11$f$ is provided on a vehicle body 15 so that the front wheel speed can always be detected.

Further, in the motorcycle 10, to a rear wheel 11$r$ (r is a subscript representative of the rear. This similarly applies also in the following description), a pulser ring 13$r$ is attached, and a rear wheel speed sensor 14$r$ that counts the number of pulses of the pulser ring 13$r$ to detect the speed of rotation of the rear wheel 11$r$ is provided on the vehicle body 15 so that the rear wheel speed can always be detected.

And, the motorcycle 10 includes a fluid pressure modulator 21$f$ for the front wheel and a valve unit 22$f$ for the front wheel on the vehicle body 15 at positions below a fuel tank 16 provided on the vehicle body 15, and further includes a fluid pressure modulator 21$r$ for the rear wheel and a valve unit 22$r$ for the rear wheel located at positions below a seat 17 provided on the vehicle body 15. The motorcycle 10 further includes an electronic control unit 47 provided rearwardly of the seat 17.

Figure 2:
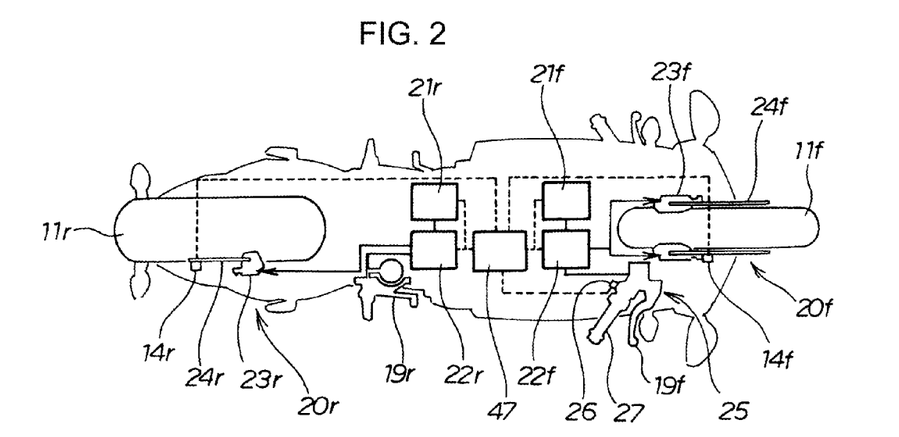
FIG. 2 is a plan view (conceptual view) of the motorcycle.

As shown in FIG. 2, the front wheel 11$f$ is braked by a brake apparatus 20$f$ for the front wheel which operates in response to the operation amount of brake operation device 19$f$ for the front wheel represented by a brake lever or the operation amount of brake operation device 19$r$ for the rear wheel represented by a brake pedal. Meanwhile, the rear wheel 11$r$ is braked by a brake apparatus 20$r$ for the rear wheel.

The brake apparatus 20$f$ for the front wheel is configured, for example, from the fluid pressure modulator 21$f$ (whose structure is hereinafter described) for the front wheel, the valve unit 22$f$ for the front wheel, a brake caliper 23$f$ and a brake disk 24$f$.

The brake apparatus 20$r$ for the rear wheel is configured, for example, from the fluid pressure modulator 21$r$ for the rear wheel, the valve unit 22$r$ for the rear wheel, a brake caliper 23$r$ and a brake disk 24$r$.

Mode changeover device 26 is provided on a handle bar 25 in the proximity of the brake operation device 19$f$ for the front wheel.

Figure 3:
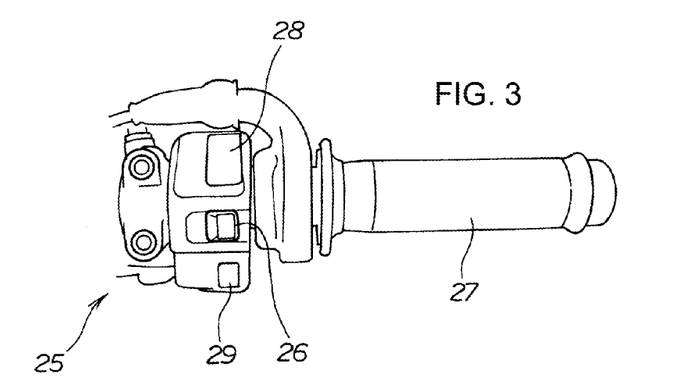
FIG. 3 is a view illustrating an arrangement of mode changeover device.

This mode changeover device 26 is disposed, as shown in FIG. 3, between a kill switch 28 at an upper position and a starter switch 29 at a lower position on the vehicle body center side with respect to a right grip 27. For the mode changeover device 26, a changeover switch which is moved leftwardly and rightwardly to carry out changeover between a first control mode and a second control mode is suitably used. Alternatively, the changeover switch may be a push-push switch which carries out the changeover between the first control mode and the second control mode when it is pushed repetitively.

It is to be noted that the mode changeover device 26 can be provided not only on the handle bar 25 but also around a meter or around a combination switch. However, it is recommended to provide the mode changeover device 26 on the handle bar 25, as in the present example, because a changeover operation can be carried out while the right grip 27 is gripped.

Figure 4:
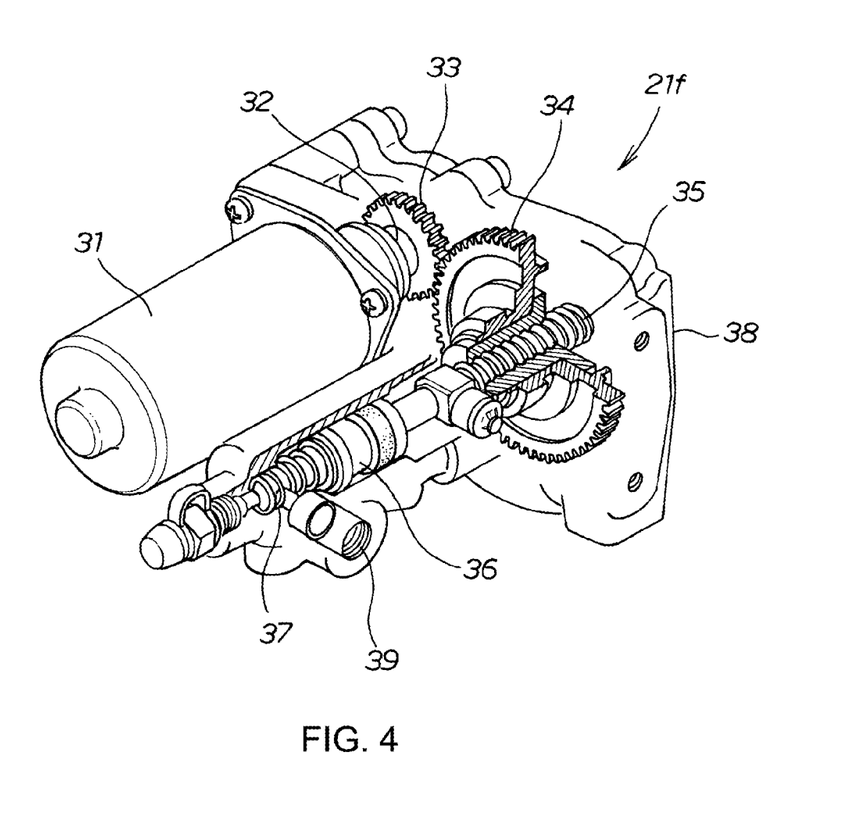
FIG. 4 is a perspective view of a fluid pressure modulator.

A preferred example of the fluid pressure modulator 21$f$ for the front wheel is described with reference to FIG. 4. As shown in FIG. 4, the fluid pressure modulator 21$f$ for the front wheel is configured from a controlling motor 31, a driving gear wheel 33 that is driven by a motor shaft 32 of the controlling motor 31, a driven gear wheel 34 that has a diameter greater than that of the driving gear wheel 33 and is driven by the driving gear wheel 33, a ball screw 35 that is held in meshing engagement with the driven gear wheel 34 and moves in an axial direction thereof although it does not rotate, a modulator piston 36 that is pushed by the ball screw 35, a spring 37 that pushes back the modulator piston 36, and a case 38 that collectively accommodates the driving gear wheel 33, driven gear wheel 34 and modulator piston 36 therein.

If the modulator piston 36 is moved forwardly using the controlling motor 31 as a driving source, then the brake fluid is compressed to generate fluid pressure. The pressurized brake fluid is sent to the valve unit (reference character 22$f$ in FIG. 2) for the front wheel trough a port 39. If the controlling motor 31 is rotated reversely to move the modulator piston 36 backwardly, then the brake fluid is decompressed.

The fluid pressure modulator (reference character 21$r$ in FIG. 2) for the rear wheel has a same structure as that of the fluid pressure modulator 21$f$ for the front wheel, and, therefore, description thereof is omitted.

Figure 5:
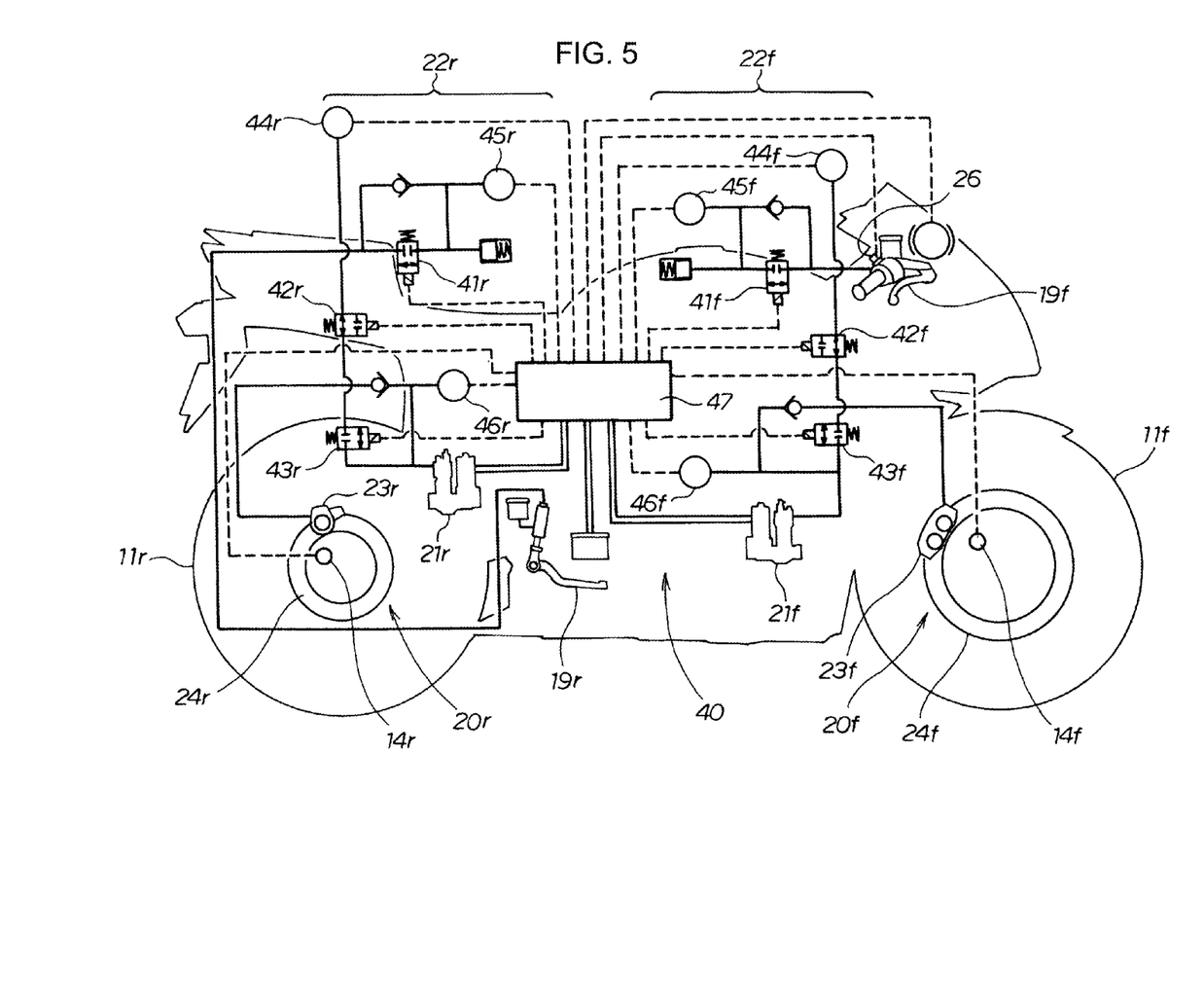
FIG. 5 is a circuit diagram of a brake controlling apparatus for the motorcycle according to the present invention.

The configuration of the valve unit 22$f$ for the front wheel and the valve unit 22$r$ for the rear wheel is described with reference to FIG. 5. FIG. 5 is a combined ABS control diagram illustrating a brake controlling apparatus 40 for the motorcycle, and the valve unit 22$f$ for the front wheel which is an essential part of the brake controlling apparatus 40 includes, as principal components, a first electromagnetic valve 41$f$ of the normally closed type, a second electromagnetic valve 42$f$ of the normally open type, a third electromagnetic valve 43$f$ of the normally closed type, a first pressure sensor 44$f$, a second pressure sensor 45$f$ and a third pressure sensor 46$f$.

Since also the valve unit 22$r$ for the rear wheel is similar, r is added to reference characters of the elements and description thereof is omitted.

Action of the CBS (Combined Brake System), which interlocks the brake apparatus 20$f$ and 20$r$ for the front and rear wheels with each other, is described hereinafter. The CBS is a system that causes, when the brake operation device 19$f$ and 19$r$ of the front and rear wheels is operated, the brake apparatus 20$f$ and 20$r$ for the front and rear wheels to exhibit braking action.

An example wherein the brake operation device 19$f$ for the front wheel is operated is described below. In this instance, the first electromagnetic valve 41$f$ and the second electromagnetic valve 42$f$ for the front wheel are opened while the third electromagnetic valve 43$f$ is closed, and then a second electromagnetic valve 42$r$ for the rear wheel is opened and a third electromagnetic valve 43$r$ is closed.

If the brake operation device 19$f$ for the front wheel is operated, then fluid pressure is generated, and this fluid pressure is detected by the second pressure sensor 45$f$. Based on the detection value, the electronic control unit 47 determines a target value (pressure) for the third pressure sensor 46$f$ for the front wheel and a target value (pressure) for a third pressure sensor 46$r$ for the rear wheel. Then, the electronic control unit 47 causes the fluid pressure modulators 21$f$ and 21$r$ for the front and rear wheels to operate so that the fluid pressure modulator 21$f$ for the front wheel and the fluid pressure modulator 21$r$ for the rear wheel may generate the target values (pressures) to cause the brake apparatus 20$f$ and 20$r$ for the front and rear wheels to brake the front wheel 11$f$ and the rear wheel 11$r$.

Also, when the brake operation device 19$r$ for the rear wheel is operated, the electronic control unit 47 determines a target value (pressure) for the third pressure sensor 46$f$ for the front wheel and a target value (pressure) for the third pressure sensor 46$r$ for the rear wheel and causes the fluid pressure modulators 21$f$ and 21$r$ for the front and rear wheels to operate so that the fluid pressure modulator 21$f$ for the front wheel and the fluid pressure modulator 21$r$ for the rear wheel may generate the target values (pressures) to cause the brake apparatus 20$f$ and 20$r$ for the front and rear wheels to brake the front wheel 11$f$ and the rear wheel 11$r$.

Then, in the present invention, by manually changing over the mode changeover device 26, various target values (control modes) can be set, and various braking forms can be created.

For the control mode, a plurality of (two in the present example) modes are provided. Both of a first control mode and a second control mode assume the following. In the case where the brake operation device 19$f$ for the front wheel is operated, braking force for the front wheel is generated by the brake apparatus 20$f$ for the front wheel in response to an operation amount of the brake operation device 19$f$ for the front wheel, and braking force for the rear wheel interlocked with the operation amount of the brake operation device 19$f$ for the front wheel is generated by the brake apparatus 20$r$ for the rear wheel, which is not operated. Or, in the case where the brake operation device 19$r$ for the rear wheel is operated, braking force for the rear wheel is generated by the brake apparatus 20$r$ for the rear wheel in response to an operation amount of the brake operation device 19$r$ for the rear wheel, and braking force for the front wheel interlocked with the operation amount of the brake operation device 19$r$ for the rear wheel is generated by the brake apparatus 20$f$ for the front wheel, which is not operated.

If the first control mode is selected by the mode changeover device 26, then a map 1 (illustrated in FIG. 6) is selected in the electronic control unit 47, but if the second control mode is selected by the mode changeover device 26, a map 2 (illustrated in FIG. 8) is selected in the electronic control unit 47.

Figure 6:
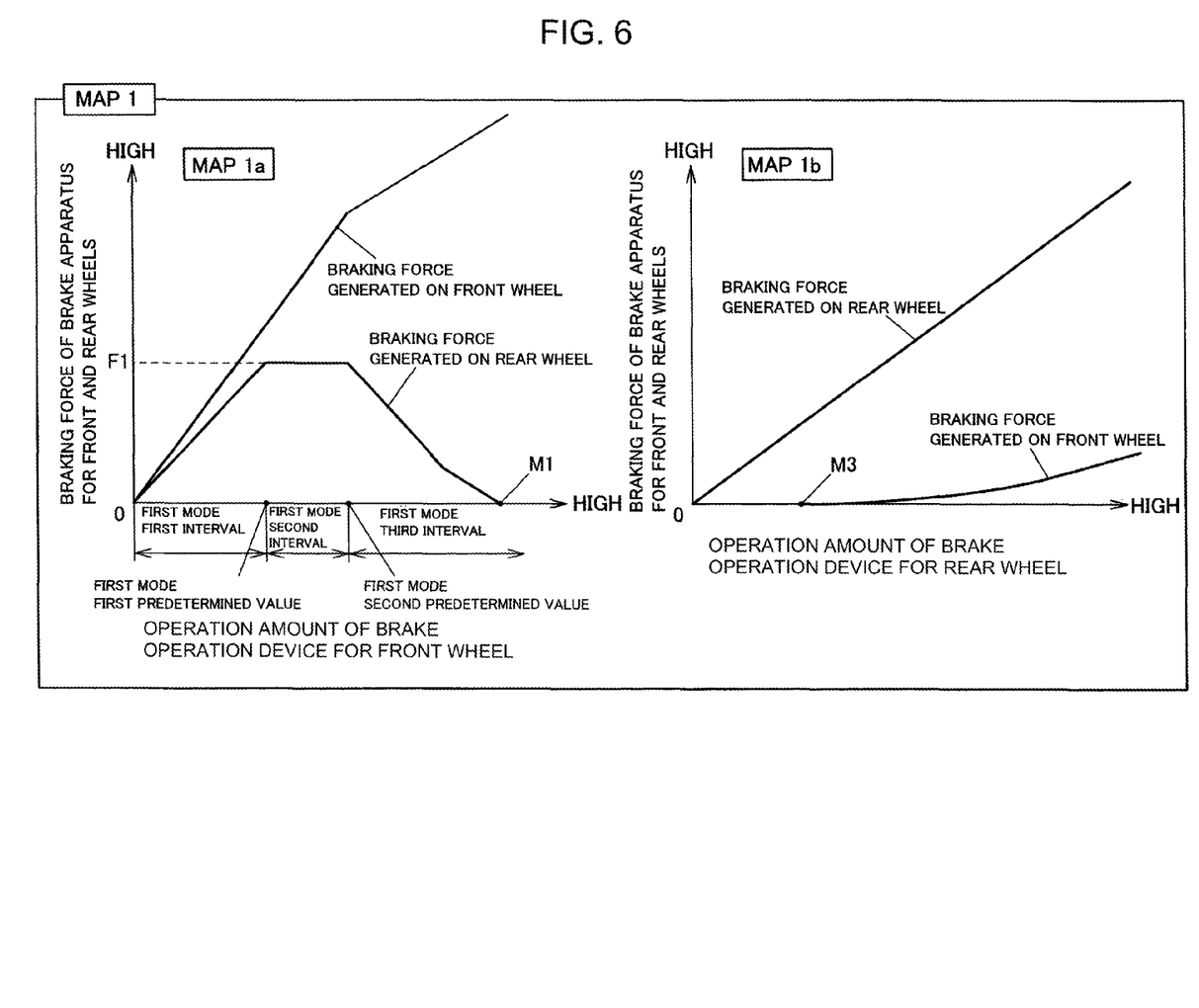
FIG. 6 is a map diagram relating to a first control mode.

As illustrated in FIG. 6, the map 1 is configured from a map 1$a$ and another map 1$b$. In the map 1$a$, the axis of abscissa represents the operation amount of the brake operation devices for the front wheel and the axis of ordinate represents the braking force of the brake apparatus for the front and rear wheels, and a curve similar to a substantially linear function (the curve is noted as braking force that is generated on the front wheel) is a braking force curve provided to the brake apparatus for the front wheel. Meanwhile, another curve of a substantially trapezoidal shape (the curve is noted as braking force that is generated on the rear wheel) is a braking force curve provided to the brake apparatus for the rear wheel.

In particular, in the case where the brake operation device for the front wheel is operated in a state in which the first control mode is selected by the mode changeover device 26, the map 1$a$ is selected.

It is to be noted that the operation amount of the brake operation device for the front wheel or the rear wheel on the axis of abscissa can be determined from the detection value by the second pressure sensor (reference character 45$f$ or 45$r$ in FIG. 5). Further, the braking force of each of the brake apparatus for the front and rear wheels on the axis of ordinate is obtained by conversion from a target fluid pressure to be applied from the electronic control unit (reference numeral 47 in FIG. 5) to the third pressure sensor (reference character 46$f$ or 46$r$ in FIG. 5) and the fluid pressure modulator (reference character 21$f$ or 21$r$ in FIG. 5).

If attention is paid to the curve of a substantially trapezoidal shape in the map 1$a$, then within a first mode, first interval from zero to a first mode, first predetermined value of the operation amount of the brake operation device for the front wheel, the braking force generated on the rear wheel gradually increases in accordance with an increase of the operation amount.

During a first mode, second interval from the first mode, first predetermined value to a first mode, second predetermined value, which is higher than the first mode, first predetermined value, of the operation amount of the brake operation device for the front wheel, the braking force generated on the rear wheel is held at a maximum value F1 within the first mode, first interval regardless of increase of the operation amount.

In the example illustrated, during a first mode, third interval during within which the operation amount of the brake operation device for the front wheel is higher than the first mode, second predetermined value, the braking force generated on the rear wheel gradually decreases, for example, to zero in accordance with an increase of the operation amount.

According to the map 1a, if the brake operation device for the front wheel is operated, then the vehicle body is decelerated by braking force of the front wheel and braking force of the rear wheel.

Figure 7A:
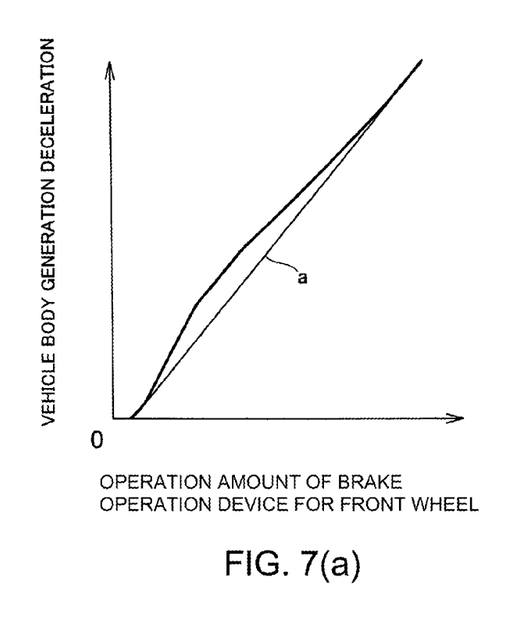
FIG. 7 is a correlation diagram between an operation amount and a vehicle body generation deceleration in the first control mode.

A deceleration generated on the vehicle body based on the map 1a is illustrated in FIG. 7(a). As shown in FIG. 7(a), the deceleration curve exhibits an upwardly convex form with respect to an auxiliary linear line a. In particular, since the deceleration curve is spaced upwardly from the auxiliary linear line a in a region in which the operation amount is small (generally in a light input region), only if a rider carries out a braking operation lightly, a high deceleration is generated on the vehicle body, and the vehicle body can be decelerated effectively.

In addition, as apparent from the map 1a of FIG. 6, since, in the light input region, braking by the front wheel and braking by the rear wheel can be effectuated, there is little possibility that the vehicle body may suffer from pitching. As a result, while a defect that the vehicle body exhibits a jerky movement, which is likely to occur with a brake apparatus which exhibits good efficacy, is overcome, the vehicle body can be decelerated effectively upon traveling on a public road.

In the map 1b of FIG. 6, the axis of abscissa represents the operation amount of the brake operation device for the rear wheel and the axis of ordinate represents the braking force of the brake apparatus for the front and rear wheels, and a curve like a substantially linear function (the curve is denoted as braking force that is generated on the rear wheel) is a braking force curve provided to the brake apparatus for the rear wheel. Further, a substantially bent (the curve is denoted as braking force that is generated on the front wheel) is a braking force curve provided to the brake apparatus for the front wheel.

In particular, in the case where the brake operation device for the rear wheel is operated in a state in which the first control mode is selected by the mode changeover device 26, the map 1b is selected. According to the map 1b, if the brake operation device for the rear wheel is operated, then the vehicle body is decelerated by braking force of the front wheel and braking force of the rear wheel.

Figure 7B:
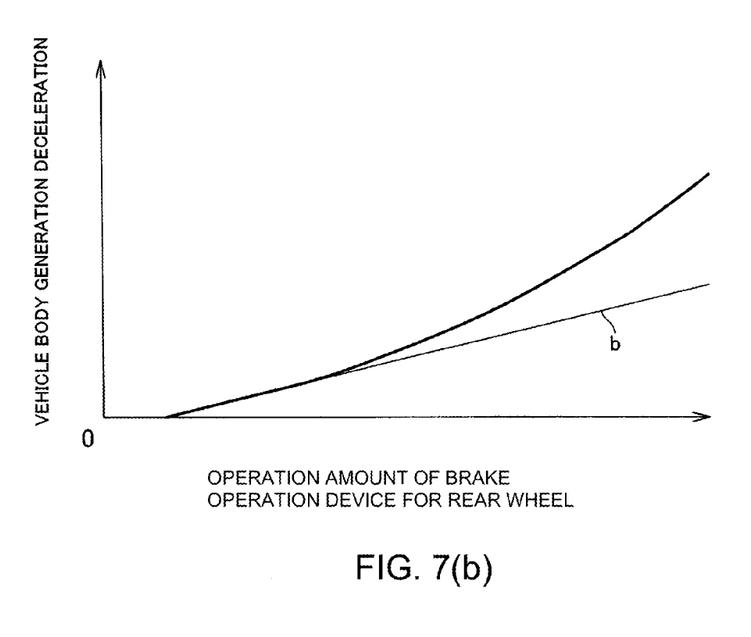

A deceleration generated on the vehicle body based on the map 1b is illustrated in FIG. 7(b). As shown in FIG. 7(b), the deceleration curve is spaced upwardly from an auxiliary linear line b suddenly after a medium input of the operation input. Only by operating the brake operation device for the rear wheel upon traveling on a public road, sufficient deceleration in a region after a medium input region is obtained. Accordingly, upon emergency, even in a case in which the brake operation device for the front wheel cannot be operated, a sufficient braking performance can be obtained only by the brake operation device for the rear wheel.

Figure 8:
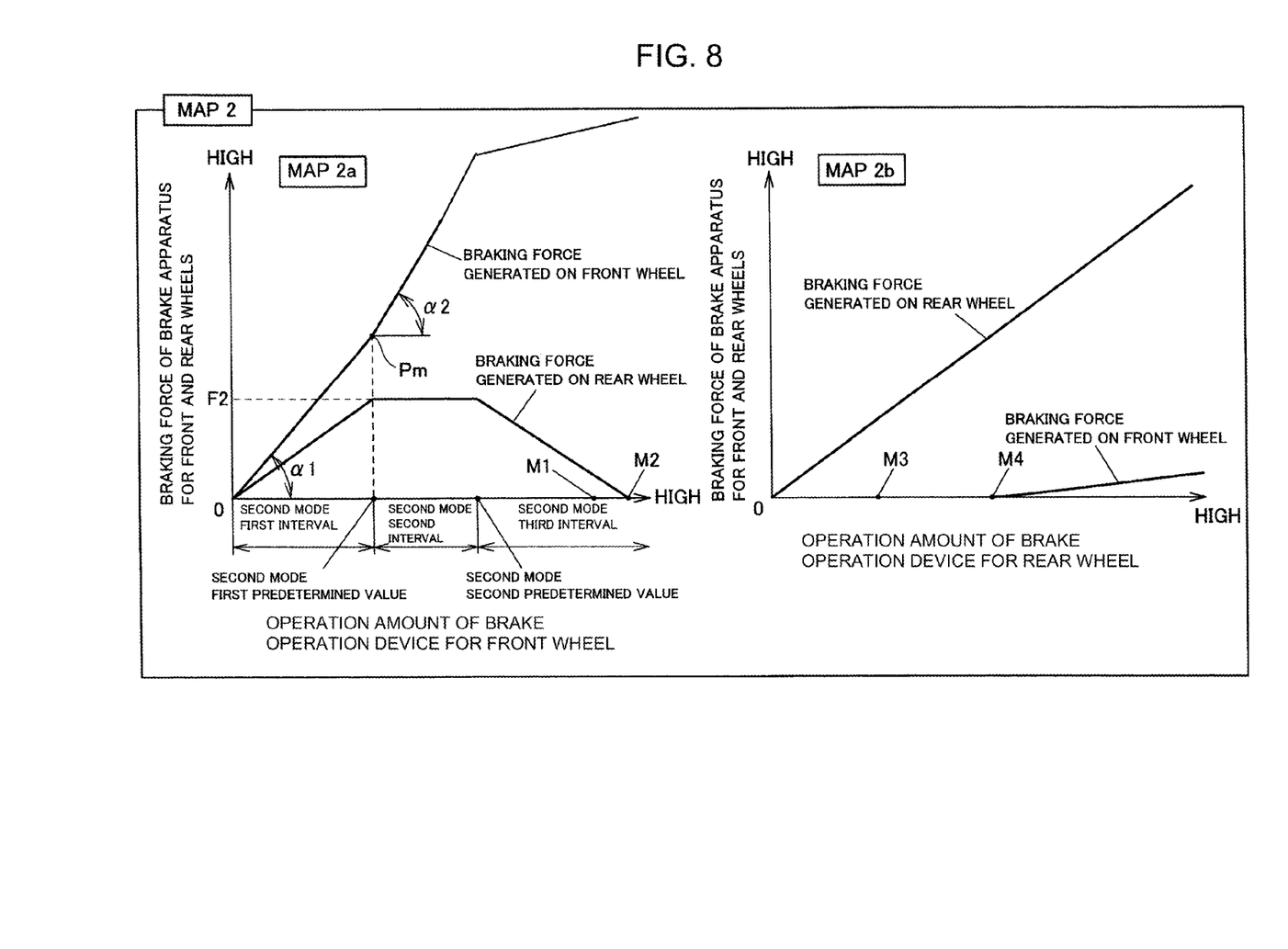
FIG. 8 is a map diagram relating to a second control mode.

Further, as shown in FIG. 8, the map 2 is configured from a map 2a and another map 2b. In the map 2a, the axis of abscissa represents the operation amount of the brake operation device for the front wheel and the axis of ordinate represents the braking force of the brake apparatus for the front and rear wheels, and a curve having an intermediately bent shape (the curve is denoted as braking force that is generated on the front wheel) is a braking force curve provided to the brake apparatus for the front wheel. Meanwhile, another curve of a substantially trapezoidal shape (the curve is denoted as braking force that is generated on the rear wheel) is a braking force curve provided to the brake apparatus for the rear wheel.

In particular, in the case where the brake operation device for the front wheel is operated in a state in which the second control mode is selected by the mode changeover device 26, the map 2a is selected.

If attention is paid to the curve of a substantially trapezoidal shape in the map 2a, then during a second mode, first interval from zero to a second mode, first predetermined value of the operation amount of the brake operation device for the front wheel, the braking force generated on the rear wheel gradually increases in accordance with an increase of the operation amount.

During a second mode, second interval from the second mode, first predetermined value to a second mode, second predetermined value, which is higher than the second mode, first predetermined value, of the operation amount of the brake operation device for the front wheel, the braking force generated on the rear wheel is held at a maximum value F2 within the second mode, first interval regardless of increase of the operation amount.

A case is illustrated in the figure in which, during a second mode, third interval within which the operation amount of the brake operation device for the front wheel is higher than the second mode, second predetermined value, the braking force generated on the rear wheel gradually decreases, for example, to zero in accordance with an increase of the operation amount.

Here, it is significant to vary the increasing rate of the braking force of the front wheel with respect to the operation amount at an intermediate point Pm (in this example, the second mode, second predetermined value) from a start point of the second mode, first interval to an end point of the second mode, second interval.

The position of the intermediate point Pm can be determined arbitrarily only if the point is included in the range from the start point of the second mode, first interval to the end point of the second mode, second interval, and the number of such points is not limited to one.

The increasing rate of the braking force till the point Pm can be represented by a first inclinational of the curve. The increasing rate of the braking force after the point Pm is a second inclination $\alpha 2$ of the curve. Preferably, the inclinations $\alpha 1$ and $\alpha 2$ are set so as to satisfy $\alpha 1 < \alpha 2$ (i.e., the first inclination is less than the second inclination). As a result, the braking force of the front wheel is represented as a curve that is bent downwardly at an inflection point (point Pm). An advantage provided by setting to $1 < \alpha 2$ is described below.

Since the curve shown in FIG. 7(a) is upwardly convex, that is, upwardly bent, the deceleration of the axis of ordinate does not exhibit a linear proportion to the operation amount of the axis of abscissa. It is sometimes demanded that the operation amount and the deceleration exhibit a relationship of a linear proportion therebetween.

In this instance, the braking force curve of the front wheel is made downwardly convex as described hereinabove in connection with the map 2a of FIG. 8. Consequently, the (braking force of the front wheel+braking force of the rear wheel) becomes low, and as a result, the curve shown in FIG. 7(a) approaches the auxiliary linear line a.

Figure 9A:
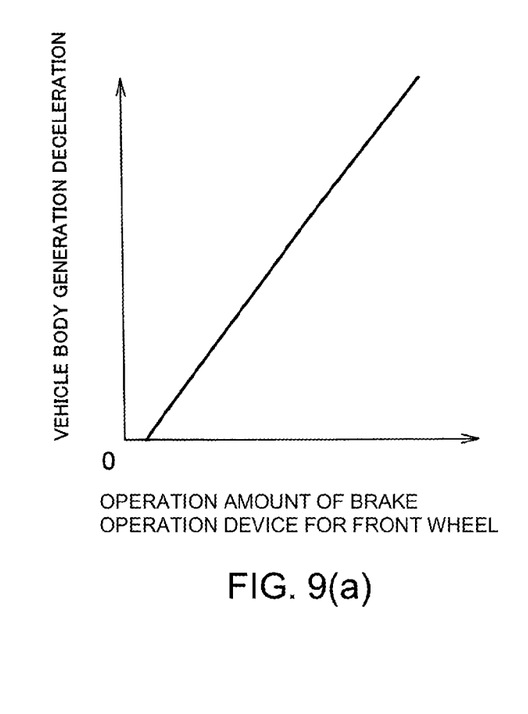
FIG. 9 is a correlation diagram between an operation amount and a vehicle body generation deceleration in the second control mode.

A vehicle body generation deceleration obtained by the map 2a of FIG. 8 is illustrated in FIG. 9(a). As shown in FIG. 9(a), the operation amount and the deceleration exhibit a relationship of a substantially linear proportion.

In comparison with FIG. 7(a), in FIG. 9(a), the change of the deceleration with respect to the input (operation amount) is moderate, and therefore, delicate vehicle body posture control during cornering, that is, front-rear load adjustment, is better. It can be considered that this is suitable for race traveling for which delicate vehicle body posture control is demanded rather than traveling on a public road.

It is to be noted that also it is possible to establish the relationship not only of α1<α2 (map 2a of FIG. 8) or α1=α2 (corresponding to the map 1a of FIG. 6) but also of α1>α2 by changing the increasing rate of the braking force of the front wheel with respect to the operation amount at an intermediate point from the starting point of the first interval to the ending point of the second interval. If α1>α2, then a higher vehicle body generation deceleration can be obtained by an operation by a light input.

In the map 2b of FIG. 8, the axis of abscissa represents the operation amount of the brake operation device for the rear wheel and the axis of ordinate represents the braking force of the brake apparatus for the front and rear wheels, and a curve like a substantially linear function (the curve is denoted as braking force that is generated on the rear wheel) is a braking force curve provided to the brake apparatus for the rear wheel. Further, a curve at a lower position (the curve is denoted as braking force that is generated on the front wheel) is a braking force curve provided to the brake apparatus for the front wheel.

In particular, in the case where the brake operation device for the rear wheel is operated in a state in which the second control mode is selected by the mode changeover device 26, the map 2b is selected.

Here, it is significant that a start point M4 of the lower curve (braking force of the front wheel) is moved to the operation amount maximum side from a start point M3 illustrated in the map 1b of FIG. 6. This reason is described below.

While the deceleration curve in FIG. 7(b) is bent, it is sometimes desired that the deceleration increases in a linear proportion to the operation amount. Since the start point M4 moves, the (braking force of the front wheel+braking force of the rear wheel) decreases, and the deceleration curve of FIG. 7(b) approaches the auxiliary linear line b.

Figure 9B:
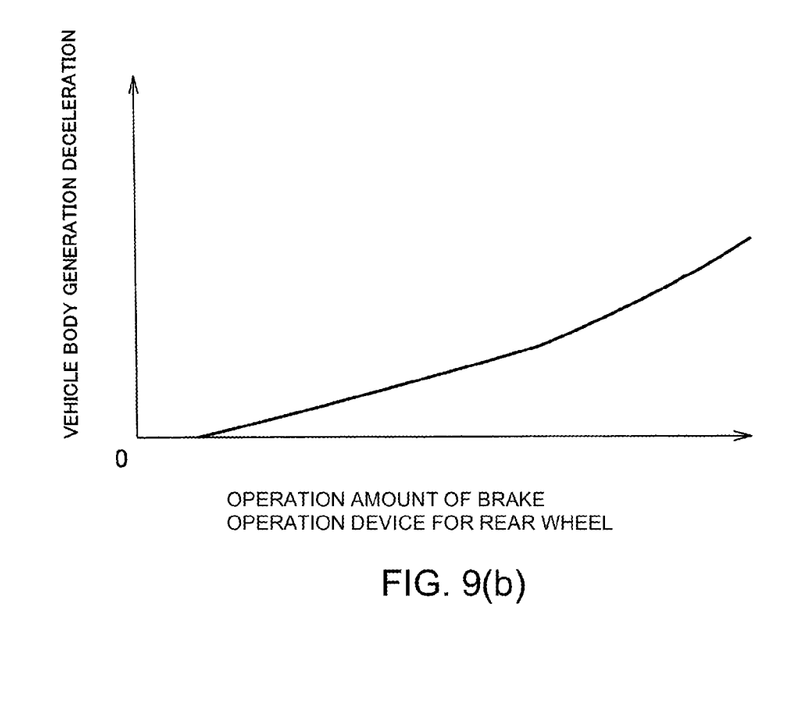

A vehicle body generation deceleration obtained by the map 2b of FIG. 8 is illustrated in FIG. 9(b). As shown in FIG. 9(b), the operation amount and the deceleration exhibit a relationship of a substantially linear proportion to a medium input.

In comparison with FIG. 7(b), in FIG. 9(b), the variation of the deceleration with respect to the input (operation amount) is moderate, and therefore, delicate vehicle body posture control is better. It can be considered that this is suitable for race traveling for which delicate vehicle body posture control is demanded rather than traveling on a public road.

Further, FIGS. 6 and 8 are compared with each other. The map 2a is different from the map 1a in the following point. The braking force F2 is lower than the braking force F1. In particular, the braking force that is generated on the rear wheel within the second mode, first interval is set lower than the braking force that is generated on the rear wheel within the first mode, first interval.

Further, the second mode, first interval is set longer than the first mode, first interval, and the second mode, second interval is set longer than the first mode, second interval while the second mode, third interval is set longer than the first mode, third interval.

During the first interval (initial interval of braking) of the second control mode, the braking force generated on the rear wheel by the brake operation device for the front wheel is suppressed as compared to the first control mode. The second control mode can be used as a mode that is useful, for example, in the case of a will to carry out attachment of importance to posture control of the turnability rather than a will to brake during cornering.

Meanwhile, in the second interval, the braking force generated on the rear wheel is kept fixed. Then, the braking force F2 generated on the rear wheel in the second mode, second interval illustrated in the map 2b is set lower than the braking force F1 generated on the rear wheel in the first mode, second interval illustrated in the map 2a.

In comparison with the first control mode, the second control mode is a mode that is useful in the case where the posture is controlled by braking force generated on the rear wheel. Further, in the first mode, third interval of the map 1a, the braking force generated on the rear wheel is gradually reduced, for example, to zero. The axis of abscissa when zero is reached (the operation amount of the brake operation device for the front wheel) is represented by M1.

Similarly, in the second mode, third interval of the map 2a, the braking force generated on the rear wheel is gradually reduced, for example, to zero. The axis of abscissa when zero is reached (the operation amount of the brake operation device for the front wheel) is represented by M2.

For the reference, M1 of the map 1a is transcribed to the map 2a. In the present invention, M1<M2 is applied. In particular, the second control mode (map 2a) is set similarly to the first control mode (map 1a) such that a case in which, in the second mode, third interval in which the operation amount of the brake operation device for the front wheel exceeds the second mode, second predetermined value, the braking force generated on the rear wheel gradually decreases, for example, to zero in response to an increase of the operation amount is illustrated, and besides the operation amount M2 at the braking force of zero is set higher than the operation amount M1 in the first control mode.

For example, in the case where deceleration is to be carried out in a period of time as short as possible, it is demanded to effectively generate both of the braking force to be generated on the front wheel and the braking force to be generated on the rear wheel.

In the second control mode, for example, upon full braking or the like, it is easy to generate both braking forces to the maximum rather than in the first control mode. Further, in the second control mode, the rider need not operate both of the brake operation device for the front wheel and the brake operation device for the rear wheel, but may only carry out operation of the brake operation device for the front wheel. In other words, in the second control mode, upon full braking, an ideal front-rear braking distribution can be carried out automatically, and it can be said that the rider can concentrate its attention on the brake operation for the front wheel.

For the brake operation device for the front wheel described above, a front brake provided on a motorcycle is used preferably, and for the brake operation device for the rear wheel, a brake pedal is used preferably.

In the map 1a of FIG. 6, if the brake operation device for the front wheel is operated, then the braking force generated on the front wheel increases particularly in the first mode, third period. This similarly applies also to the map 2a of FIG. 8.

Control suitable for a characteristic unique to a motorcycle that, as the braking force increases, the ground load (gripping force) of the front wheel increases and the ground load of the rear wheel decreases is carried out.

Now, attention is paid to the map 1*b* of FIG. 6 and the map 2*b* of FIG. 8. The map 1*b* of FIG. 6 relates to the first control mode, and as indicated by the map 1*b*, when the brake operation device for the rear wheel is operated, control for causing braking force to be generated by the brake apparatus for the rear wheel in response to an operation amount of the brake operation device for the rear wheel and causing the brake apparatus for the front wheel, which is not operated, to generate braking force interlocked with the operation amount of the brake operation device for the rear wheel is carried out. Then, the braking force to be generated on the rear wheel is set higher than the braking force to be generated on the front wheel.

The braking force to be generated on the front wheel is set so as to be generated from a point spaced by M3 from the origin. The map 2*b* of FIG. 8 relates to the second control mode, and as indicated by the map 2*b*, when the brake operation device for the rear wheel is operated, control for causing braking force to be generated by the brake apparatus for the rear wheel in response to an operation amount of the brake operation device for the rear wheel and causing the brake apparatus for the front wheel, which is not operated, to generate braking force interlocked with the operation amount of the brake operation device for the rear wheel is carried out. Then, the braking force to be generated on the rear wheel is set higher than the braking force to be generated on the front wheel.

The braking force generated on the front wheel is set so as to be generated from a point spaced by M4 from the origin.

For reference, M3 of the map 1*b* is transcribed to the map 2*b*. In the present invention, M3<M4. In other words, the operation amounts M3 and M4 of the brake operation device for the rear wheel until braking of the front wheel is started are set such that the operation amount M4 in the second control mode is greater than the operation amount M3 in the first control mode.

In the first control mode illustrated in the map 1*b*, since braking force to be generated on the front wheel is generated a little earlier than that in the second control mode, the interlocking brake operates even from an early stage of the braking operation and the speed can be reduced with certainty.

If the brake operation device for the front wheel is a brake lever and the brake operation device for the rear wheel is a brake pedal, then it is said that the brake pedal operated by a foot requires a more delicate operation than the brake pedal operated by a hand. According to the map 1*b*, deceleration by a foot operation, which is said to require a delicate operation, can be carried out with certainty.

On the contrary, in the second control mode, since, at an early stage of the braking operation, braking force that is to be generated on the front wheel is not generated as yet as illustrated in the map 2*b*, at this stage, control that is focused on posture control rather than braking is carried out at this stage. In this manner, with the present invention, braking control of a motorcycle with which a traveling environment varies can be achieved by arbitrarily changing over the first control mode (map 1) and the second control mode (map 2) therebetween.

What is claimed is:

1. A brake controlling apparatus for a motorcycle wherein an operation amount applied to each brake operation device for front and rear wheels is detected by an electronic control unit and fluid pressures are generated by fluid pressure modulators for the front and rear wheels based on the detection values and then braking force is generated for brake apparatus for the front and rear wheels by the fluid pressures, wherein:

said electronic control unit causes said brake apparatus for the front and rear wheels to be operated such that:

when said brake operation device for the front wheel is operated, said brake apparatus for the front wheel generates braking force for the front wheel in response to an operation amount of said brake operation device for the front wheel and causing said brake apparatus for the rear wheel, which is not operated, to generate braking force for the rear wheel that interlocks with the operation amount of said brake operation device for the front wheel;

wherein, during a first interval in which the operation amount of said brake operation device of the front wheel changes from zero to a first predetermined value, the braking force for the front wheel increases gradually and the braking force for the rear wheel gradually increases irrespective of a brake operation of the rear wheel;

wherein, during a second interval in which the operation amount of said brake operation device of the front wheel changes from the first predetermined value to a second predetermined value that is higher than the first predetermined value, gradually increasing the braking force for the front wheel while keeping the braking force for the rear wheel to a maximum value in the first interval; and increasing or decreasing, within a period from a beginning of the first interval to an end of the second interval, a rate of increase of the braking force for the front wheel with respect to the operation amount to increase or decrease a deceleration of the vehicle so as to vary substantially linearly with respect to an increase of the braking force of the brake for the front wheel.

2. The brake controlling apparatus for the motorcycle according to claim 1, wherein, during a third interval within which the operation amount of said brake operation device for the front wheel exceeds the second predetermined value, the braking force for the front wheel is gradually increased and the braking force for the rear wheel is gradually decreased in response to the increase of the operation amount.

3. The brake controlling apparatus for the motorcycle according to claim 1, wherein the rate of increase of the braking force for the front wheel with respect to the operation amount is set such that the rate of increase after an intermediate point from the beginning of the first interval to the end of the second interval is higher than the increasing rate from the first interval to the intermediate point.

4. The brake controlling apparatus for the motorcycle according to claim 2, wherein the rate of increase of the braking force for the front wheel with respect to the operation amount is set such that the rate of increase after an intermediate point from the beginning of the first interval to the end of the second interval is higher than the increasing rate from the first interval to the intermediate point.

5. A brake controlling apparatus for a motorcycle wherein an operation amount applied to each brake operation device for front and rear wheels is detected by an electronic control unit and fluid pressures are generated by fluid pressure modulators for the front and rear wheels based on the detection values and then braking force is generated for brake apparatus for the front and rear wheels by the fluid pressures, wherein:

said brake controlling apparatus includes mode changeover device for allowing changeover of a plurality of modes of the braking force by an operation by a driver;

a plurality of intervals are provided in each of the modes;

in the first mode, when said brake operation device for the front wheel is operated, braking force is generated by said brake apparatus for the front wheel in response to an operation amount of said brake operation device for the front wheel while braking force interlocking with the operation amount of said brake operation device for the front wheel is generated for the rear wheel by said brake apparatus for the rear wheel, which is not operated;

during a first interval of the first mode, within which the operation amount of said brake operation device for the front wheel varies from zero to a first mode, first predetermined value, the braking force generated on the rear wheel gradually increases corresponding to the increase of the operation amount;

during a second interval of the first mode, within which the operation amount of said brake operation device for the front wheel varies from the first mode, first predetermined value to a first mode, second predetermined value higher than the first mode first predetermined value, the braking force generated on the rear wheel is kept at a maximum value in the first mode, first interval irrespective of increase of the operation amount;

during a third interval of the first mode, within which the operation amount of said brake operation device for the front wheel exceeds the first mode, second predetermined value, the braking force generated on the rear wheel gradually decreases in a corresponding relationship to increase of the operation amount;

in the second mode, similarly to the first mode, when said brake operation device for the front wheel is operated, braking force is generated by said brake apparatus for the front wheel in response to the operation amount of said brake operation device for the front wheel while braking force interlocking with the operation amount of said brake operation device for the front wheel is generated for the rear wheel by said brake apparatus for the rear wheel, which is not operated;

during a first interval of the second mode, within which the operation amount of the brake operation device for the front wheel varies from zero to a second mode, first predetermined value, the braking force generated on the rear wheel gradually increases corresponding to the increase of the operation amount but is set lower than the braking force generated on the rear wheel within the first mode, first interval;

during a second interval of the second mode, within which the operation amount of said brake operation device for the front wheel varies from the second mode, first predetermined value to a second mode, second predetermined value higher than the second mode, first predetermined value, the braking force generated on the rear wheel is kept at a maximum value in the second mode, first interval irrespective of increase of the operation amount and is lower than braking force generated on the rear wheel within the first mode, second interval;

during a third interval of the second mode, within which the operation amount of said brake operation device for the front wheel exceeds the second mode, second predetermined value, the braking force generated on the rear wheel gradually decreases in a corresponding relationship to increase of the operation amount and the operation amount at a point at which the braking force exhibits a minimum value is set higher than the operation amount in the first mode;

during the second mode a rate of increase of the braking force for the front wheel with respect to the operation amount is changed between a beginning of the second mode, first interval and an end of the second mode second interval; and said electronic control unit controls the brake apparatus for the front and rear wheels to generate braking force in response to the selected mode.

6. The brake controlling apparatus for the motorcycle according to claim 5, wherein said mode changeover device is a switch provided on a handle bar.

7. The brake controlling apparatus for the motorcycle according to claim 5, wherein:

in the first mode and the second mode, when the brake operation device for the rear wheel is operated and the brake operation device of the front wheel is not operated, braking force is generated by said brake apparatus for the rear wheel in response to an operation amount of said brake operation device for the rear wheel while braking force interlocked with the operation amount of said brake operation device for the rear wheel is generated by said brake apparatus for the front wheel;

the braking force for the rear wheel is set higher than the braking force for the front wheel; and the operation amount of said brake operation device for the rear wheel at which braking of the front wheel is started is set such that the operation amount in the second mode is greater than the operation amount in the first mode.

* * * * *